(12) United States Patent
Williams

(10) Patent No.: US 6,263,896 B1
(45) Date of Patent: Jul. 24, 2001

(54) PRESSURE FLOW STOP

(76) Inventor: Joe L. Williams, 13621 Highway 1, Derry, LA (US) 71416

(*) Notice: Subject to any disclaimer, the term of this patent is extended or adjusted under 35 U.S.C. 154(b) by 0 days.

(21) Appl. No.: 09/576,283

(22) Filed: May 23, 2000

(51) Int. Cl.[7] .............................. F16K 43/00; F16L 55/18; F16L 55/128

(52) U.S. Cl. .................................... 137/15.15; 137/15.17; 137/15.18; 137/315.01; 137/317; 138/93; 138/94; 138/97

(58) Field of Search ............................ 137/15.01, 15.15, 137/15.17, 15.18, 317, 318, 15.03, 315.01, 315.06; 138/93, 94, 97

(56) References Cited

U.S. PATENT DOCUMENTS

| | | | |
|---|---|---|---|
| 1,946,138 | * | 2/1934 | Gardner .................................. 138/93 |
| 3,211,574 | * | 10/1965 | Shannon ................................... 62/77 |
| 3,607,361 | * | 9/1971 | Hight ..................................... 427/238 |
| 4,122,869 | * | 10/1978 | Roberson, Sr. ......................... 138/93 |
| 4,398,565 | * | 8/1983 | Williamson ............................. 138/93 |
| 4,427,031 | * | 1/1984 | Giovanni et al. ...................... 138/97 |
| 4,429,568 | * | 2/1984 | Sullivan ................................. 73/49.8 |
| 4,949,744 | * | 8/1990 | Heed et al. ............................. 138/95 |
| 5,357,763 | * | 10/1994 | Vogel ....................................... 62/77 |
| 5,482,076 | * | 1/1996 | Taylor et al. .......................... 138/97 |
| 5,934,304 | * | 8/1999 | Peterson et al. ....................... 138/97 |
| 5,934,311 | * | 8/1999 | Brown ................................... 137/240 |
| 5,967,191 | * | 10/1999 | Mummolo ............................... 138/97 |

FOREIGN PATENT DOCUMENTS

2573505 * 5/1986 (FR) ..................................... 138/93

* cited by examiner

*Primary Examiner*—George L. Walton
(74) *Attorney, Agent, or Firm*—John M Harrison

(57) ABSTRACT

A pressure flow stop for temporarily blocking flow of water from a main water supply line to a residence or business, in order to facilitate replacement of a damaged, defective or deteriorated water shutoff valve, or "curbstop", of the residence or business. In a preferred embodiment the pressure flow stop is characterized by an elongated, typically cylindrical stem housing which is removably attached to the damaged, defective or deteriorated shutoff valve after the shutoff valve is closed and the water meter is removed from the shutoff valve, respectively. An elongated, flexible stem, terminated by an inflatable balloon, is slidably disposed in the stem housing, and the shutoff valve is opened to facilitate extension of the balloon end of the stem from the housing through the shutoff valve and into the water source pipe leading from the main water line. The balloon is inflated to obstruct the water source pipe and block further flow of water from the pipe into the shutoff valve as the shutoff valve is detached from the pipe and removed from over the stem and a replacement shutoff valve is slipped over the stem and replaced on the pipe. Finally, the balloon is deflated, the stem is removed from the replacement shutoff valve, the replacement shutoff valve is closed, the water meter is threaded on the replacement shutoff valve and the replacement shutoff valve is opened, respectively, to resume flow of water from the main water line to the residence or business.

16 Claims, 3 Drawing Sheets

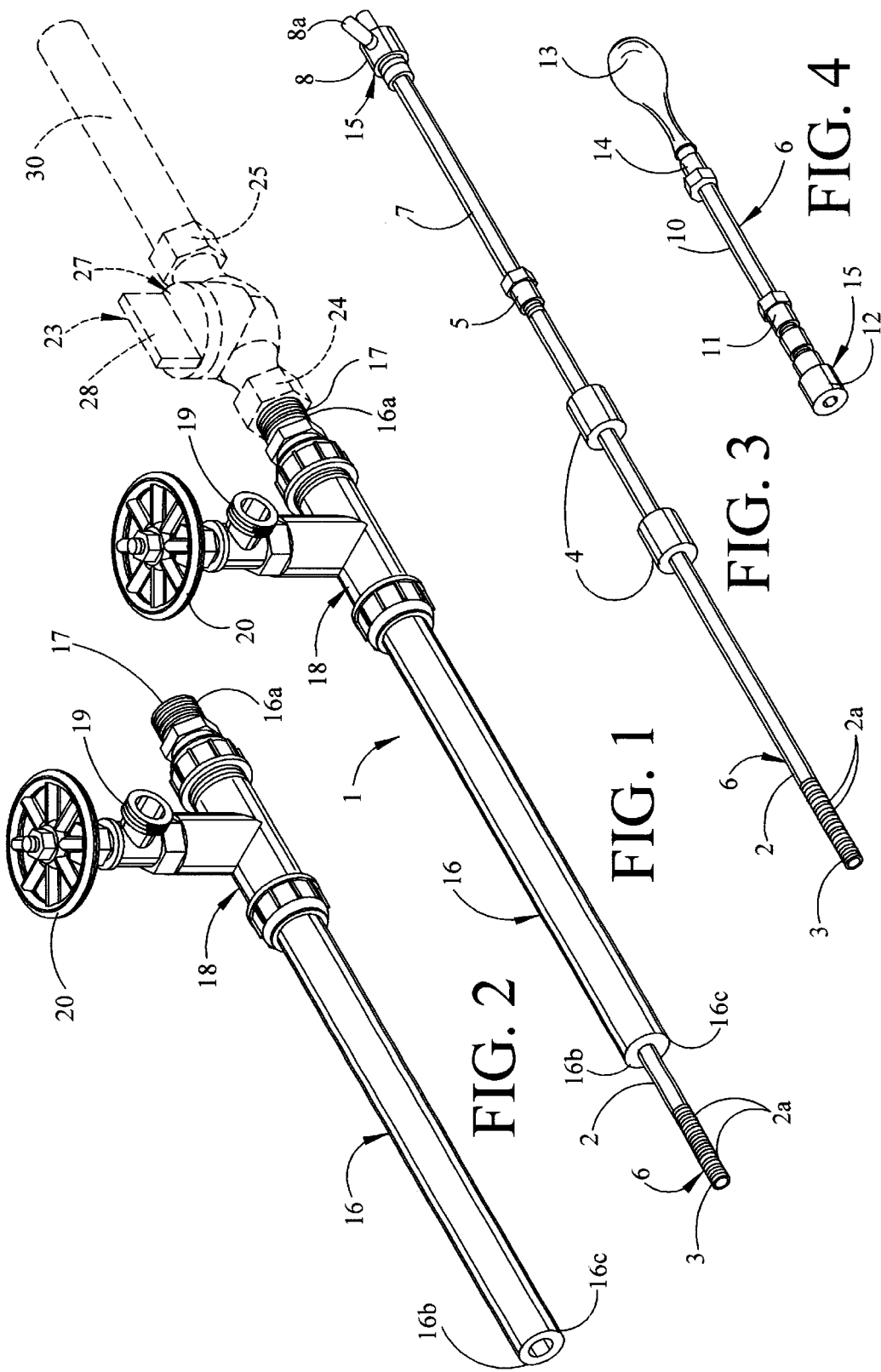

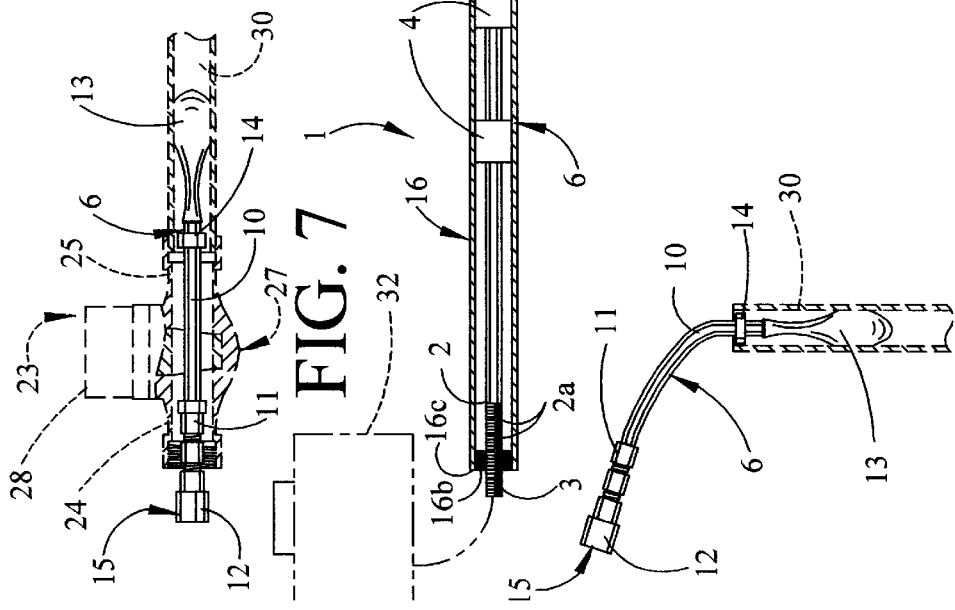
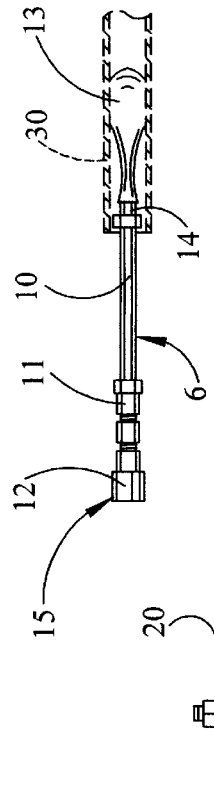
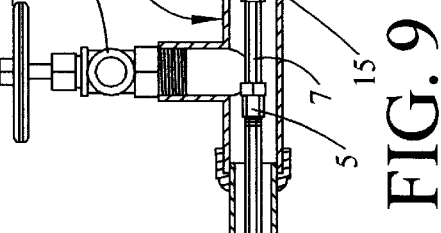
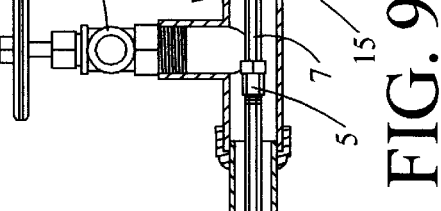

PRESSURE FLOW STOP

BACKGROUND OF THE INVENTION

1. Field of the Invention

This invention relates to a water shutoff valve or "curbstop" changing apparatus and more particularly, to an apparatus which is adapted to temporarily block flow of water through a water shutoff valve of a residence or business in order to facilitate replacing the damaged, deteriorated or defective water shutoff valve, without requiring termination of water flow through the main water line. Accordingly, water service interruption is limited to the residence or business having the damaged, deteriorated or defective shutoff valve, while water service to the remaining residences or businesses served by the main water line continues during replacement of the valve. In a preferred embodiment the pressure flow stop of this invention includes an elongated, typically cylindrical stem housing and an elongated, flexible stem, terminated by an inflatable balloon and slidably disposed in the housing. In application of the pressure flow stop, the shutoff valve to be replaced is closed, the water meter is unthreaded from the shutoff valve and the stem housing is threaded on the shutoff valve in place of the water meter. The shutoff valve is opened to facilitate extension of the balloon and inflation stem from the housing through the shutoff valve and into the water source pipe leading from the main water line. The balloon is inflated to obstruct the water source pipe and block further flow of water from the pipe into the shutoff valve. While the water source pipe remains obstructed, the stem housing is unthreaded from the shutoff valve, the shutoff valve is unthreaded from the pipe and slipped over the stem, a replacement shutoff valve is slipped over the stem and threaded on the pipe and the stem housing is threaded on the replacement shutoff valve. After the balloon is deflated, the balloon and stem are removed from the replacement shutoff valve, the replacement shutoff valve is closed and the stem housing is unthreaded from the replacement shutoff valve. Finally, the water meter is threaded on the replacement shutoff valve and the replacement shutoff valve is opened to resume flow of water from the main water line to the residence or business.

Modern conventional water systems typically interconnect the water piping systems of multiple residences or businesses. In order to replace a damaged, deteriorated or defective water shutoff valve, commonly known as a "curbstop", of one of the residences or businesses, the main water line which serves all of the residences or businesses in the system must typically be crimped, frozen or shut off during the replacement operation. However, these conventional techniques may damage the water line, require expensive machinery and refrigerants and shut off the water supply to all of the residences or businesses served by the main water line.

Accordingly, an object of this invention is to provide a pressure flow stop for temporarily blocking flow of water through the water shutoff valve of a residence or business, in order to facilitate replacement of the valve.

Another object of this invention is to provide an apparatus which is adapted to temporarily terminate flow of water through a water shutoff valve of a residence or business in a water distribution system in order to facilitate replacing the damaged, deteriorated or defective water shutoff valve without requiring termination of water flow through the main water line and interruption of water supply to other residences or businesses served by the water distribution system.

Still another object of this invention is to provide a pressure flow stop for temporarily blocking flow of water through a water shutoff valve of a residence or business in order to facilitate replacing the valve, which pressure flow stop is characterized by an elongated, typically cylindrical housing which is removably attached to the water shutoff valve after the water meter is removed from the valve; and an elongated, flexible stem terminated by an inflatable balloon which is slidably disposed in the housing, wherein the balloon and stem are extended from the housing and through the open water shutoff valve and positioned in a water source line to which the water shutoff valve is attached, and inflated on the stem to obstruct the water source line or pipe and substantially block flow of water from the water source line to the water shutoff valve to facilitate replacement of the valve.

Yet another object of this invention is to provide a pressure flow stop for temporarily blocking flow of water from a main water supply line to a residence or business in order to facilitate replacement of a damaged, defective or deteriorated water shutoff valve of the residence or business, which pressure flow stop in a preferred embodiment is characterized by an elongated stem housing which is initially removably threaded on the damaged, defective or deteriorated shutoff valve after the shutoff valve is closed and the water meter is unthreaded from the shutoff valve; and an elongated, flexible stem which is terminated by an inflatable balloon and is slidably disposed in the stem housing. The shutoff valve is opened to facilitate extension of the stem and balloon from the attached stem housing, through the open shutoff valve and into the water source line which extends from the main water line. The balloon is then selectively inflated to obstruct the interior of the water source line and block further flow of water from the main water line into the shutoff valve. The shutoff valve is detached from the balloon-obstructed water source line and slipped over the stem, and a replacement shutoff valve is slipped over the stem and replaced on the water source line. The stem housing is threaded on the replacement shutoff valve as the inflated balloon continues to obstruct the water source line, and the balloon is deflated and the stem and deflated balloon are removed from the water source line and replacement shutoff valve. After the replacement shutoff valve is closed and the stem housing is unthreaded from the replacement shutoff valve, the water meter is threaded on the replacement shutoff valve and the shutoff valve is opened, respectively, to resume flow of water from the water source line to the residence or business.

A still further object of this invention is to provide a method of replacing a damaged, deteriorated or defective water shutoff valve or "curbstop" of a residence or business without requiring termination of water service to the other residences or businesses with which the water shutoff valve is connected.

2. Summary of the Invention

These and other objects of the invention are provided in a pressure flow stop which is adapted to temporarily block flow of water through a damaged, deteriorated or defective water shutoff valve of a residence or business, in order to facilitate replacing the water shutoff valve without requiring termination of water flow in the main water line and interrupting water distribution to other residences or businesses served by the main water line. In a preferred embodiment the pressure flow stop of this invention includes an elongated, typically cylindrical stem housing and an elongated, flexible stem, terminated by an inflatable balloon and slidably disposed in the housing. In application of the pressure flow stop, the shutoff valve to be replaced is closed, the water meter is unthreaded from the shutoff valve and the stem housing is threaded on the shutoff valve in place of the water meter. The shutoff valve is opened to facilitate extension of the balloon and stem from the housing, through the shutoff valve and into the water source pipe leading from the main water line. The balloon is inflated to obstruct the water source pipe and block further flow of water from the pipe into the shutoff valve. While the water source pipe remains obstructed by the balloon, the stem housing is unthreaded from the shutoff valve, the shutoff valve is unthreaded from the pipe and slipped over the stem, a replacement shutoff valve is slipped over the stem and threaded on the pipe and the stem housing is threaded on the replacement shutoff valve. The balloon is deflated in the water source pipe, the stem and balloon are removed from the water source pipe and replacement shutoff valve and the replacement shutoff valve is closed. Finally, the stem housing is replaced by the water meter on the replacement shutoff valve and the replacement shutoff valve is opened to resume flow of water from the main water line to the residence or business.

BRIEF DESCRIPTION OF THE DRAWINGS

The invention will be better understood by reference to the accompanying drawings, wherein:

FIG. 1 is a perspective view of a preferred embodiment of the pressure flow stop of this invention, removably attached to a water shutoff valve connected to a water source pipe, both illustrated in phantom, in typical application of the pressure flow stop;

FIG. 2 is a perspective view of the stem housing component of the pressure flow stop illustrated in FIG. 1, removed from the water shutoff valve (not illustrated);

FIG. 3 is a perspective view of the housing shaft and backup stem components of the stem of the pressure flow stop;

FIG. 4 is a perspective view of the inflation stem and balloon components of the stem of the pressure flow stop, with the inflation stem uncoupled from the backup stem illustrated in FIG. 3;

FIG. 7 is a longitudinal sectional view of the water shutoff valve and water source pipe (in phantom) illustrated in FIGS. 5 and 6, with the backup stem component of the pressure flow stop uncoupled from the inflation stem component of the pressure flow stop, and the inflation stem extending through the damaged, defective or deteriorated water shutoff valve and the inflated balloon of the pressure flow stop, attached to the inflation stem, obstructing the water source pipe prior to removing the water shutoff valve from the water source pipe;

FIG. 8 is a longitudinal sectional view of the water source pipe illustrated in FIG. 7, illustrated in phantom, with the damaged, defective or deteriorated water shutoff valve (not illustrated) removed from the water source pipe and the inflated balloon of the pressure flow stop remaining in obstructing configuration in the water source pipe, after removal of the water shutoff valve from the water source pipe and prior to mounting a replacement water shutoff valve on the water source pipe;

FIG. 9 is a longitudinal sectional view of the stem housing component of the pressure flow stop, connected to an L-shaped damaged, defective or deteriorated water shutoff valve, illustrated in phantom, with the stem of the pressure flow stop extending through the stem housing and water shutoff valve and the inflated balloon of the pressure flow stop obstructing a vertical water source pipe (illustrated in phantom), connected to the water shutoff valve;

FIG. 10 is a longitudinal sectional view of the water shutoff valve and water source pipe illustrated in FIG. 9, with the inflation stem component of the pressure flow stop extending through the water shutoff valve and the inflated balloon of the pressure flow stop remaining in obstructing configuration in the water source pipe, after removal of the stem housing from the water shutoff valve and uncoupling of the backup stem from the inflation stem prior to removing the water shutoff valve from the water source pipe; and FIG. 11 is a longitudinal sectional view of the vertical water source pipe illustrated in FIGS. 9 and 10, illustrated in phantom, with the inflated balloon of the pressure flow stop remaining in obstructing configuration in the water source pipe prior to mounting a replacement water shutoff valve on the water source pipe.

DESCRIPTION OF THE PREFERRED EMBODIMENTS

Figure 5:
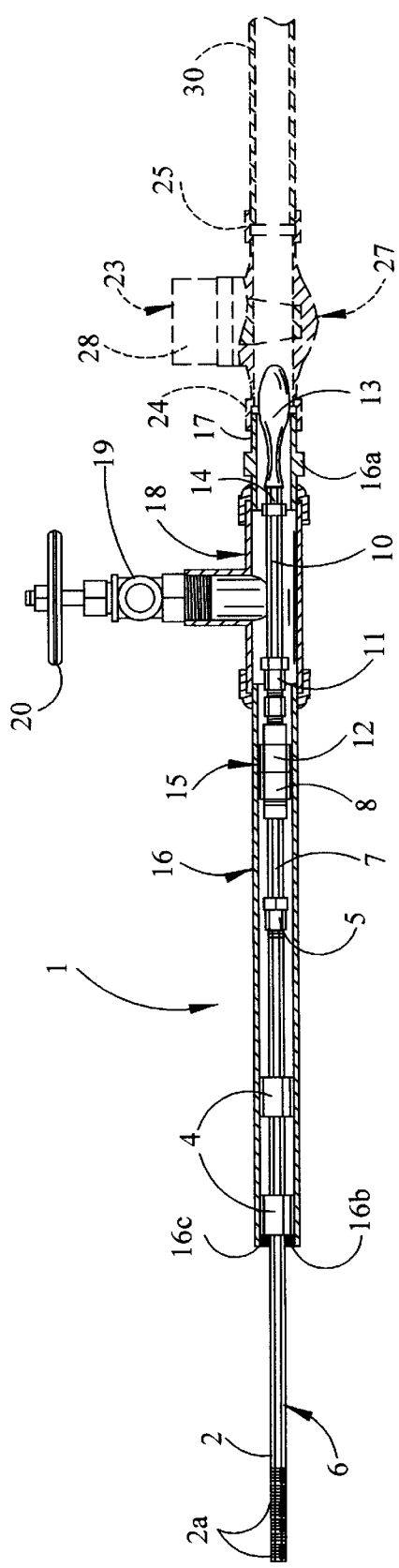
FIG. 5 is a longitudinal sectional view of the stem housing component of the pressure flow stop, shown removably threaded on a damaged, deteriorated or defective water shutoff valve, illustrated in phantom, and the stem of the pressure flow stop extending from the stem housing, prior to advancing the balloon component of the stem through the water shutoff valve and into a horizontal water source pipe (in phantom), connected to the water shutoff valve, in typical application of the pressure flow stop.

Referring initially to FIGS. 1 and 9 of the drawings, a conventional water shutoff valve 23 (illustrated in phantom in FIGS. 1 and 9), commonly known as a "curbstop", typically includes a straight valve housing 27, as illustrated in FIG. 1, or a generally L-shaped valve housing 27, as illustrated in FIG. 9. The valve housing 27 is fitted with a valve 28. A water meter (not illustrated) is typically threadibly attached to a water meter coupling 24 of the valve housing 27, and a water line coupling 25 of the valve housing 27 is threaded in fluid communication with a water source pipe 30 (illustrated in phantom in FIGS. 1 and 9), connected to a main water line (not illustrated). A constant supply of water is normally distributed from the main water line to each of multiple residences or businesses, through the water source line 30, valve housing 27, open valve 28 of the water shutoff valve 23, and connected water meter, and into a water service pipe (not illustrated) which distributes the water to the residence or business. When it becomes necessary to replace a damaged, defective or deteriorated water shutoff valve 23 of one of the residences or businesses served by the main water line typically due to leakage of the valve 28, water flow to all of the residences or businesses typically is temporarily terminated by means of crimping or freezing the main water line, or otherwise terminating water flow through the water line. The pressure flow stop of this invention, generally illustrated by reference numeral 1, is designed to temporarily terminate water flow from the water source pipe 30 to the water shutoff valve 23 in order to facilitate replacement of the shutoff valve 23. Accordingly, termination of water flow in the main water line and interruption of water service to other residences or businesses served by the main water line is unnecessary.

Referring next to FIGS. 1–5 of the drawings, the pressure flow stop 1 of this invention includes an elongated stem 6 including an elongated, rigid tubular housing shaft 2, typically constructed of steel or aluminum and fitted with a pneumatic stem valve 3 in the rear end thereof. Multiple shaft threads 2a are provided in the housing shaft 2 adjacent to the pneumatic stem valve 3, for purposes which will be hereinafter further described. Two o-rings 4 are provided on the housing shaft 2, in spaced-apart relationship with respect to each other, as illustrated in FIG. 3. A compression fitting 5 typically receives the front end of the housing shaft 2 and an elongated, flexible, typically plastic, tubular backup stem 7 extends from pneumatic communication with the compression fitting 5 and terminates in pneumatic communication with a male element 8 of a split-housing check valve 15, fitted with a lock tab 8a. In application of the pressure flow stop 1 as hereinafter further described, the male element 8 of the split-housing check valve 15 is removably inserted in a companion female element 12 of the split-housing check valve 15, fitted in pneumatic communication with a flexible, typically plastic, tubular inflation stem 10 typically by means of a second compression fitting 11, as illustrated in FIG. 4. Accordingly, when the male element 8 is coupled to the female element 12 of the check valve 15, the check valve 15 allows bidirectional flow of air between the backup stem 7 and the inflation stem 10 of the stem 6, whereas the female element 12 presents flow of air from the inflation stem 10 through the female element 12 of the check valve 15 when the male element 8 is uncoupled from the female element 12 of the check valve 15, as hereinafter described. A rubber balloon 13 is fitted on the front end of the inflation stem 10, in pneumatic communication therewith typically by means of a third compression fitting 14. The stem 6 of the pressure flow stop 1 is slidably mounted in an elongated, typically cylindrical stem housing 16, typically constructed of polyvinyl chloride (PVC) and fitted with a water relief valve 18 having a spigot 19 and a handle 20, adjacent to the front end 16a (FIG. 1) of the stem housing 16 for purposes which will be hereinafter described. A typically ¾" threaded adaptor 17 is provided on the front end 16a of the stem housing 16 for threadibly engaging the companion water meter coupling 24 (illustrated in phantom in FIG. 1) of the valve housing 27, in application of the pressure flow stop 1 as hereinafter described. As further illustrated in FIG. 1, a threaded insert 16b is provided in the stem housing 16 at the rear end 16c of the stem housing 16. The housing shaft 2 of the stem 6 is slidably disposed in the threaded insert 16b, which is fitted with insert threads (not illustrated) which engage the companion shaft threads 2a of the housing shaft 2 in application of the pressure flow stop 1 as hereinafter described.

Figure 6:
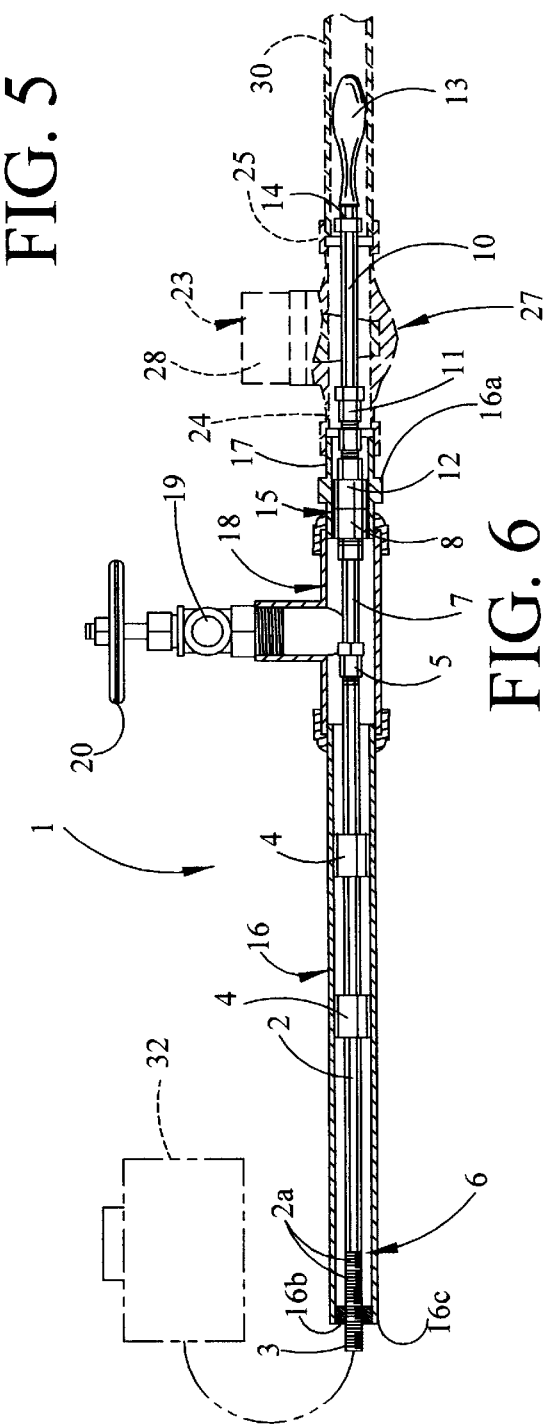
FIG. 6 is a longitudinal sectional view of the stem housing component of the pressure flow stop illustrated in FIG. 5, with the stem component of the pressure flow stop extending through the water shutoff valve (in phantom) and the balloon component of the pressure flow stop shown inflated and obstructing the horizontal water source pipe (in phantom), connected to the water shutoff valve.

Referring again to FIGS. 1 and 5 and to FIGS. 6–11 of the drawings, in typical application the pressure flow stop 1 of this invention is designed to temporarily block water flow from the water source pipe 30, attached to a main water line (not illustrated), to a damaged, defective or deteriorated water shutoff valve 23 of a business or residence, in order to replace the water shutoff valve 23. Accordingly, the valve 28 of the water shutoff valve 23 is initially closed in order to halt flow of water from the water source pipe 30 into the water meter coupling 24 of the valve housing 27, and attached water meter (not illustrated, threadibly attached to the water meter coupling 24). The water meter is next unthreaded from the water meter coupling 24, and the threaded adaptor 17 of the stem housing 16 is caused to threadibly engage the water meter coupling 24, as illustrated in FIG. 1. It will be appreciated by those skilled in the art that a 1" or other size adaptor (not illustrated) can be threaded on the typically ¾" threaded adaptor 17 to fit the water meter coupling 24 of the valve housing 27, as needed. With the inflation stem 10 coupled to the housing shaft 2 of the stem 6 at the split-housing check valve 15, the balloon 13 of the stem 6 is advanced from the front end 16a of the stem housing 16 into the water meter coupling 24 portion of the valve housing 27 of the water shutoff valve 23, by pushing the housing shaft 2 through the threaded insert 16b of the stem housing 16. The o-rings 4 of the housing shaft 2 form a water-tight seal between the open rear end 16c and the relief valve 18 of the stem housing 16 interior, as illustrated in FIG. 5. After the valve 28 is subsequently opened, the housing shaft 2 of the stem 6 is again pushed forwardly through the stem housing 16 until the shaft threads 2a of the housing shaft 2 reach the threaded insert 16c. The housing shaft 2 is then rotated using a wrench or other suitable tool (not illustrated) to facilitate threaded advancement of the housing shaft 2 through the threaded insert 16b by operation of the shaft threads 2a, and the backup stem 7 of the incrementally advancing stem 6 pushes the attached inflation stem 10 and balloon 13 through the open valve 28, into the water source pipe 30 as illustrated in FIG. 6. In the case of the L-shaped valve housing 27 illustrated in FIG. 9, the flexible inflation stem 10 bends downwardly and enters the water line coupling 25 of the valve housing 27 as the advancing balloon 13 engages the water line coupling 25 interior. Simultaneously, pressurized water flows from the water source line 30, through the valve housing 27 and open water shutoff valve 23 and into the attached stem housing 16, and is sealed in the stem housing 16 by operation of both o-rings 4 of the stem 6, located between the water relief valve 18 and rear end 16c of the stem housing 16 interior as illustrated in FIGS. 6 and 9. The housing shaft 2 is rotated and threaded progressively further into the stem housing 16 by operation of the shaft threads 2a and threaded insert 16b, until the balloon 13 is located in the proximal end portion of the water source pipe 30, as illustrated in FIGS. 6 and 9. It will be appreciated by those skilled in the art that the rigid housing shaft 2 reinforces the flexible backup stem 7 and inflation stem 10 against water pressure as the inflation stem 10 is advanced through the valve housing 27 and water source pipe 30 and pressurized water flows from the valve housing 27 into the stem housing 16. A conventional air pump 32, illustrated in phantom in FIGS. 6 and 9, is then connected to the stem valve 3 of the housing shaft 2, and the balloon 13 is inflated by introducing pressurized air into the stem valve 3 of the housing shaft 2 by conventional operation of the pump 32. The air flows through the housing shaft 2, backup stem 7, check valve 15 and inflation stem 10 and into the balloon 13, until the inflating balloon 13 substantially obstructs the interior of the water source pipe 30 and blocks further flow of pressurized water from the main water line and water source pipe 30, into the valve housing 27 of the shutoff valve 23. Water is thus sealed between the inflated balloon 13 in the water source pipe 30 and the o-rings 4 in the stem housing 16, and the water relief valve 18 in the stem housing 16 is typically opened by rotating the handle 20, in order to expel the water from the spigot 19 of the water relief valve 18. The stem housing 16 is next unthreaded from the valve housing 27, slided rearwardly on the housing shaft 2 and pulled from the stem valve 3 end of the housing shaft 2. The backup stem 7 is next uncoupled from the inflation stem 10 by lifting the lock tab 8a (FIG. 4) of the male element 8 of the split-housing check valve 15 and removing the male element 8 from the female element 12 of the split-housing check valve 15. Consequently, the female element 12 of the split-housing check valve 15 pneumatically seals the inflation stem 10 such that the balloon 13 remains inflated and sealed in the water source pipe 30, as illustrated in FIGS. 7 and 10. The damaged, deteriorated or defective water shutoff valve 23 is unthreaded from the water source pipe 30 and pulled from the check valve 15 end of the inflation stem 10 as the balloon 13 remains inflated in the water source pipe 30, as illustrated in FIGS. 8 and 11. As the water source pipe 30 remains obstructed by the inflated balloon 13, a replacement water shutoff valve 23 is slipped on the check valve 15 end of the inflation stem 10 by inserting the female element 12 of the split housing check valve 15 in the water line coupling 25 and out of the water meter coupling 24 of the replacement water shutoff valve 23, as the replacement water shutoff valve 23 is slided on the inflation stem 10, and the water line coupling 25 of the water shutoff valve 23 is threaded on the water source pipe 30, as illustrated in FIGS. 7 and 10. The backup stem 7 of the stem 6 is again pneumatically connected to the inflation stem 10 by inserting the male element 8 of the check valve 15 into the female element 12 of the check valve 15 and locking the lock tab 8a, and this opens the check valve 15 and enables flow of air from the inflation stem 10 into the backup stem 7. The stem housing 16 of the pressure flow stop 1 is next slipped over the housing shaft 2 and threaded on the water meter coupling 24 of the replacement shutoff valve 23, as illustrated in FIGS. 6 and 9. The balloon 13 is deflated in the water source pipe 30 by depressing the stem (not illustrated) of the pneumatic stem valve 3 (provided on the end of the housing shaft 2), and the housing shaft 2 is partially unthreaded from the stem housing 16 until the attached deflated balloon 13 is located in the water meter coupling 24 of the valve housing 27 of the replacement water shutoff valve 23, as illustrated in FIG. 5. Accordingly, pressurized water flows from the water source pipe 30, through the valve housing 27 and into the attached stem housing 16, and is again sealed in the stem housing 16 by operation of the o-rings 4 on the housing shaft 2 of the stem 6, as illustrated in FIG. 5 and heretofore described. The valve 28 of the replacement water shutoff valve 23 is closed, and the relief valve 18 of the stem housing 16 is again opened to release the water from the stem housing 16, through the spigot 19 of the water relief valve 18. Finally, the stem housing 16 is unthreaded from the water meter coupling 24 of the replacement water shutoff valve 23, the water meter (not illustrated) is threaded on the water meter coupling 24 of the replacement water shutoff valve 23 and the valve 28 is opened, respectively, in order to re-establish flow of water from the main water line to the residence or business serviced by the water source pipe 30.

It will be appreciated by those skilled in the art that the pressure flow stop of this invention is simple in design and operation and eliminates the necessity of terminating supply of water to multiple residences or businesses served by a main water line, under circumstances in which it is necessary to replace the water shutoff valve of one of the residences or businesses served by the main water line. The pressure flow stop 1 can be constructed in a variety of sizes in order to facilitate replacement of water shutoff valves having various sizes. While the backup stem 7 and inflation stem 10 are typically constructed of flexible plastic, it is understood that the either or both can be constructed of any elongated, water-tight tubular flexible material, including rubber or a jointed or segmented metal tube. Moreover, it is understood that any suitable pressurized fluid can be introduced into the housing shaft 2 in order to inflate the balloon 13, according to the knowledge of those skilled in the art.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A pressure flow stop for selectively blocking flow of fluid through a conduit by using pressurized air to facilitate replacing a fluid shutoff valve on the conduit and attaching a water meter to the fluid shutoff valve, said pressure flow stop comprising a stem housing for removable attachment to the fluid shutoff valve; an elongated stem for extension through said stem housing and the fluid shutoff valve, said stem comprising a stem valve for receiving the pressurized air and a housing shaft provided in pneumatic communication with said stem valve for receiving the pressurized air from said stem valve; a backup stem provided in pneumatic communication with said housing shaft for receiving the pressurized air from said housing shaft; an inflation stem removably pneumatically coupled to said backup stem for receiving the pressurized air from said backup stem; an air non-return valve provided on said inflation stem, said air non-return valve disposed in an open configuration when said inflation stem is connected to said backup stem to maintain pneumatic communication between said inflation stem and said backup stem, and said air non-return valve disposed in a closed, air-sealing cofiguration when said inflation stem is disconnected from said backup stem; and a balloon provided in pneumatic communication with said inflation stem for location in the conduit and receiving the pressurized air from said inflation stem, said balloon and said inflation stem inserted through the fluid shutoff valve and into the conduit by applying pressure against said housing shaft to advance said housing shaft in said stem housing, whereby the pressurized air flows through said stem and into said balloon and said balloon inflates on said inflation stem and substantially obstructs and blocks fluid flow through the conduit, responsive to introducing the pressurized air into said stem valve; and the fluid shutoff valve is replaced on the conduit by removing said stem housing from the fluid shutoff valve; uncoupling said backup stem from said inflation stem with said inflation stem extending through the fluid shutoff valve and said balloon obstructing the conduit, whereby said air non-return valve closes to maintain the pressurized air in said balloon; disconnecting the fluid shutoff valve from the conduit and sliding the fluid shutoff valve over said inflation stem to remove the fluid shutoff valve from said inflation stem; sliding a replacement fluid shutoff valve over said inflation stem and connecting the replacement fluid shutoff valve to the conduit, whereby said inflation stem extends through the replacement fluid shutoff valve; re-coupling said backup stem to said inflation stem, whereby said air non-return valve opens to re-establish pneumatic communication between said inflation stem and said backup stem; connecting said stem housing to the replacement fluid shutoff valve with said backup stem and said housing shaft extending through said stem housing; deflating said balloon and removing the pressurized air from said stem by operation of said stem valve; removing said balloon from the conduit by withdrawing said stem from said replacement fluid shutoff valve; closing the replacement shutoff valve; removing said stem housing from the replacement fluid shutoff valve; attaching the water meter to the replacement water shutoff valve; and opening the replacement water shutoff valve to establish flow of water from the conduit, through the replacement water shutoff valve and to the water meter.

2. The pressure flow stop of claim 1 wherein fluid flows from the conduit, through the fluid shutoff valve and into said stem housing of said pressure flow stop upon opening the fluid shutoff valve to facilitate inserting said balloon of said pressure flow stop through the fluid shutoff valve and into the conduit, said pressure flow stop further comprising a relief valve provided on said stem housing for selectively releasing the fluid from said stem housing.

3. The pressure flow stop of claim 1 comprising a fluid seal mechanism provided in said stem housing for preventing leakage of fluid from said stem housing.

4. The pressure flow stop of claim 3 wherein fluid flows from the conduit, through the fluid shutoff valve and into said stem housing of said pressure flow stop upon opening the fluid shutoff valve to facilitate inserting said balloon of said pressure flow stop through the fluid shutoff valve and into the conduit, said pressure flow stop further comprising a fluid relief valve provided on said stem housing for selectively releasing fluid from said stem housing.

5. The pressure flow stop of claim 1 comprising an air pump pneumatically connected to said stem valve and wherein the pressurized air is introduced into said stem through said stem valve by operation of said air pump.

6. The pressure flow stop of claim 5 wherein fluid flows from the conduit, through the fluid shutoff valve and into said stem housing of said pressure flow stop upon opening the fluid shutoff valve to facilitate inserting said balloon of said pressure flow stop through the fluid shutoff valve and into the conduit, said pressure flow stop further comprising a fluid relief valve provided on said stem housing for selectively releasing fluid from said stem housing.

7. The pressure flow stop of claim 5 comprising a fluid seal mechanism provided in said stem housing for preventing leakage of fluid from said stem housing.

8. The pressure flow stop of claim 7 wherein fluid flows from the conduit, through the fluid shutoff valve and into said stem housing of said pressure flow stop upon opening the fluid shutoff valve to facilitate inserting said balloon of said pressure flow stop through the fluid shutoff valve and into the conduit, said pressure flow stop further comprising a fluid relief valve provided on said stem housing for selectively releasing fluid from said stem housing.

9. A pressure flow stop for selectively blocking flow of water from a water source pipe to a water shutoff valve connected in fluid communication to the water source pipe by using pressurized air to facilitate replacing a water shutoff valve on the conduit and connecting a water meter to the water shutoff valve, which water shutoff valve includes a valve housing having a water meter coupling, a water line coupling connected to the water source pipe and a valve fitted in the valve housing between the water meter coupling and the water line coupling, said pressure flow stop comprising an elongated stem housing for removable attachment to the water meter coupling of the valve housing; a stem valve for receiving the pressurized air; a housing shaft provided in pneumatic communication with said stem valve for extension through said stem housing and receiving the pressurized air from said stem valve; at least one o-ring provided on said housing shaft for substantially sealing said stem housing; a flexible backup stem pneumatically connected to said housing shaft for receiving the pressurized air from said housing shaft; a flexible inflation stem pneumatically connected to said backup stem for extension through said stem housing and the valve housing of the water shutoff valve, respectively, and receiving the pressurized air from said backup stem; an air non-return valve provided on said inflation stem, said air non-return valve disposed in an open configuration when said inflation stem is connected to said backup stem to maintain pneumatic communication between said inflation stem and said backup stem, and said air non-return valve disposed in a closed, air-sealing cofiguration when said inflation stem is disconnected from said backup stem; and a balloon pneumatically connected to said inflation stem for location in the water source pipe, with said balloon, said backup stem and said inflation stem adapted for extension through the water shutoff valve responsive to applying pressure against said housing shaft to advance said housing shaft in said stem housing, whereby the pressurized air flows under pressure through said housing shaft, said backup stem and said inflation stem and into said balloon, respectively, and said balloon inflates on said inflation stem and substantially obstructs the water source pipe and blocks water flow from the water source pipe into the water shutoff valve, responsive to introducing the pressurized air into said stem valve; and the fluid shutoff valve is replaced on the conduit by removing said stem housing from the water shutoff valve; uncoupling said backup stem from said inflation stem with said inflation stem extending through the water shutoff valve and said balloon obstructing the conduit, whereby said air non-return valve closes to maintain the pressurized air in said balloon; disconnecting the water shutoff valve from the conduit and sliding the water shutoff valve over said inflation stem to remove the water shutoff valve from said inflation stem; sliding a replacement water shutoff valve over said inflation stem and connecting the replacement water shutoff valve to the conduit, whereby said inflation stem extends through the replacement water shutoff valve; re-coupling said backup stem to said inflation stem, whereby said air non-return valve opens to re-establish pneumatic communication between said inflation stem and said backup stem; connecting said stem housing to the replacement water shutoff valve with said backup stem and said housing shaft extending through said stem housing; deflating said balloon and removing the pressurized air from said stem by operation of said stem valve; removing said balloon from the conduit by withdrawing said stem from said replacement water shutoff valve; closing the replacement water shutoff valve; removing said stem housing from the replacement water shutoff valve; attaching the water meter to the water meter coupling on the valve housing of the replacement water shutoff valve; and opening the replacement water shutoff valve to establish flow of water from the conduit, through the replacement water shutoff valve and to the water meter.

10. The pressure flow stop of claim 9 wherein water flows from the water source pipe, through the water line coupling, valve and water meter coupling, respectively, of the water shutoff valve and into said stem housing of said pressure flow stop upon opening the water shutoff valve to facilitate inserting said balloon of said pressure flow through the water shutoff valve and into the water source pipe, said pressure flow stop further comprising a water relief valve provided on said stem housing for selectively releasing the water from said stem housing.

11. The pressure flow stop of claim 9 comprising a pneumatic stem valve provided on said housing shaft and an air pump pneumatically connected to said stem valve and wherein the pressurized air is introduced into said housing shaft through said stem valve by operation of said air pump.

12. The pressure flow stop of claim 11 wherein water flows from the water source pipe, through the water line coupling, valve and water meter coupling, respectively, of the water shutoff valve and into said stem housing of said pressure flow stop upon opening the water shutoff valve to facilitate inserting said balloon of said pressure flow stop through the water shutoff valve and into the water source pipe, said pressure flow stop further comprising a water relief valve provided on said stem housing for selectively releasing the water from said stem housing.

13. The pressure flow stop of claim 9 wherein said inflation stem is removably coupled to said backup stem.

14. The pressure flow stop of claim 13 wherein water flows from the water source pipe, through the water line coupling, valve and water meter coupling, respectively, of the water shutoff valve and into said stem housing of said pressure flow stop upon opening the water shutoff valve to facilitate inserting said balloon of said pressure flow stop through the water shutoff valve and into the water source pipe, said pressure flow stop further comprising a water relief valve provided on said stem housing for selectively releasing the water from said stem housing.

15. The pressure flow stop of claim 14 comprising a pneumatic stem valve provided on said housing shaft and an air pump pneumatically connected to said stem valve and wherein the pressurized air is introduced into said housing shaft through said stem valve by operation of said air pump.

16. A method of replacing a water shutoff valve characterized by a valve housing having a water meter coupling attached to a water meter, a water line coupling attached to a water source pipe for receiving a supply of water from a main water line and a valve fitted in the valve housing between the water meter coupling and the water line coupling, said method comprising:

(a). providing a pressure flow stop comprising an elongated stem housing; an elongated housing shaft slidably disposed in said stem housing for receiving pressurized air; a pair of o-rings provided on said housing shaft in spaced-apart relationship to each other for substantially sealing said housing shaft in said stem housing; an elongated, flexible, hollow backup stem pneumatically connected to said housing shaft for receiving the pressurized air from said housing shaft; a flexible inflation stem removably and pneumatically coupled to said backup stem for receiving the pressurized air from said backup stem; an air non-return valve provided on said inflation stem, said air non-return valve disposed in an open configuration when said backup stem is coupled to said inflation stem to establish pneumatic communication between said backup stem and said inflation stem, and said air non-return valve disposed in a closed, air-sealing configuration when said backup stem is uncoupled from said inflation stem; and a balloon provided in pneumatic communication with said inflation stem for receiving the pressurized air from said inflation stem, whereby said balloon inflates on said inflation stem responsive to introducing the pressurized air into said stem housing;

(b). closing the valve of the water shutoff valve in order to stop flow of water from the water source pipe to the water meter;

(c). removing the water meter from the water meter coupling of the water shutoff valve;

(d). removably connecting said stem housing of said pressure flow stop in fluid communication with the water meter coupling of the water shutoff valve;

(e). extending said backup stem, said inflation stem and said balloon of said pressure flow stop from said stem housing of said pressure flow stop by applying pressure to said housing shaft of said pressure flow stop to slide said housing shaft of said pressure flow stop in said stem housing of said pressure flow stop and terminating extension of said housing shaft of said pressure flow stop through said stem housing of said pressure flow stop by releasing pressure on said housing shaft of said pressure flow stop when said balloon of said pressure flow stop is located in the water meter coupling of the water shutoff valve;

(f). opening the valve of the water shutoff valve, whereby water flows under pressure from the water source pipe, through the water shutoff valve and into said stem housing of said pressure flow stop, and said o-rings on said housing shaft of said pressure flow stop substantially prevent the water from leaking from said stem housing of said pressure flow stop;

(g). slidably extending said housing shaft of said pressure flow stop through said stem housing of said pressure flow stop by applying pressure to said housing shaft of said pressure flow stop, to extend said balloon, said inflation stem and said backup stem of said pressure flow stop through the water shutoff valve until said balloon of said pressure flow stop is located in the water source pipe, and then terminating slidable extension of said housing shaft of said pressure flow stop through said stem housing of said pressure flow stop by releasing pressure on said housing shaft of said pressure flow stop;

(h). inflating said balloon of said pressure flow stop in the water source pipe by introducing pressurized air into said housing shaft of said pressure flow stop, whereby said balloon of said pressure flow stop inflates on said inflation stem of said pressure flow stop and substantially obstructs the water source pipe and blocks flow of water from the water source pipe into the valve housing of the water shutoff valve;

(i). detaching said stem housing of said pressure flow stop from the water meter coupling of the water shutoff valve and uncoupling said backup stem of said pressure flow stop from said inflation stem of said pressure flow stop, whereby said air non-return valve closes to prevent deflation of said balloon of said pressure flow stop;

(j). detaching the water shutoff valve from the water source pipe and removing the water shutoff valve from said inflation stem of said pressure flow stop by sliding the water shutoff valve over said inflation stem of said pressure flow stop after detaching the water shutoff valve from the water source pipe;

(k). sliding a replacement water shutoff valve on said inflation stem of said pressure flow stop and connecting the replacement water shutoff valve to the water source pipe;

(l). coupling said backup stem of said pressure flow stop to said inflation stem of said pressure flow stop, whereby said air non-return valve opens to establish pneumatic communication between said inflation stem and said backup stem of said pressure flow stop;

(m). sliding said stem housing of said pressure flow stop on said housing shaft of said pressure flow stop and said inflation stem of said pressure flow stop and connecting said stem housing of said pressure flow stop to the water meter coupling of the replacement water shutoff valve;

(n). deflating said balloon of said pressure flow stop in the water source pipe;

(o). retracting said deflated balloon of said pressure flow stop from the water source pipe into the water meter coupling of the replacement water shutoff valve by applying pressure to said housing shaft of said pressure flow stop to partially extend said housing shaft of said pressure flow stop from said stem housing of said pressure flow stop;

(p). closing the valve of the water shutoff valve;

(q). removing said stem housing of said pressure flow stop from the water meter coupling of the replacement water shutoff valve and connecting the water meter to the water meter coupling of the replacement water shutoff valve; and (r). opening the valve of the replacement water shutoff valve to re-establish flow of water from the water source pipe to the water meter.

* * * * *

UNITED STATES PATENT AND TRADEMARK OFFICE
CERTIFICATE OF CORRECTION

PATENT NO. : 6,263,896 B1  Page 1 of 1
DATED : May 22, 2001
INVENTOR(S) : Joel L. Williams It is certified that error appears in the above-identified patent and that said Letters Patent is hereby corrected as shown below:

<u>Title page,</u>
Inventor's name should read -- Joe L. Williams -- instead of "Joel L. Williams".

Signed and Sealed this

Fifth Day of February, 2002

Attest:

JAMES E. ROGAN
*Attesting Officer*   *Director of the United States Patent and Trademark Office*